(12) United States Patent
Slavin et al.

(10) Patent No.: US 11,755,449 B1
(45) Date of Patent: Sep. 12, 2023

(54) SCREEN FEED ANALYTICS

(71) Applicant: Alarm.com Incorporated, Tysons, VA (US)

(72) Inventors: Alison Jane Slavin, Falls Church, VA (US); Charles Richard Alpert, Snoqualmie, WA (US); Kevin Maurer, Tysons, VA (US); Aaron Lee Roberts, Centreville, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 480 days.

(21) Appl. No.: 15/995,392

(22) Filed: Jun. 1, 2018

Related U.S. Application Data

(60) Provisional application No. 62/513,513, filed on Jun. 1, 2017.

(51) Int. Cl.
*G06F 11/34* (2006.01)
*G06F 11/30* (2006.01)
*H04L 9/40* (2022.01)

(52) U.S. Cl.
CPC ........ *G06F 11/3438* (2013.01); *G06F 11/3006* (2013.01); *H04L 63/102* (2013.01)

(58) Field of Classification Search
CPC ... H04L 63/102; G06F 11/3006; G06F 11/3438
See application file for complete search history.

(56) References Cited

U.S. PATENT DOCUMENTS 7,039,676 B1* 5/2006 Day et al. ............. H04M 3/567
345/473
10,169,571 B1* 1/2019 Attfield et al. ........ G06F 21/604
2011/0001605 A1* 1/2011 Kiani et al. .......... G06F 3/0482
235/492
2014/0122396 A1* 5/2014 Swaminathan et al. ... G06N 5/02
706/14
2016/0078750 A1* 3/2016 King et al. ............. G16H 40/20
340/506
2017/0041454 A1* 2/2017 Nicholls et al. ... H04L 41/5009
2017/0149795 A1* 5/2017 Day, II ................. H04W 4/029
2017/0339178 A1* 11/2017 Mahaffey et al. ... H04L 41/142
2018/0001140 A1* 1/2018 Mendels et al. ... A61B 5/02438
2018/0012077 A1* 1/2018 Laska et al. ............. H04N 7/18
2019/0272725 A1* 9/2019 Viklund et al. .... G08B 21/0423

OTHER PUBLICATIONS

Viklund provisional app. 62/459519, Specification, Feb. 15, 2017 for U.S. Appl. No. 2019/0272725 A1.*

* cited by examiner

*Primary Examiner* — Mohamed A. Wasel
*Assistant Examiner* — Timothy Sowa
(74) *Attorney, Agent, or Firm* — Fish & Richardson P.C.

(57) ABSTRACT

Systems and techniques are described for monitoring screen activity of a computing device and performing designated system actions based on the monitored activity. In some implementations, activity data indicating usage of a computing device by a user within a property over a particular time period is obtained. Sensor data collected by a monitoring system that monitors the property over the particular time period is then obtained. An activity monitoring rule that specifies (i) one or more conditions associated with usage of the computing device by the user, and (ii) an action to perform in response to satisfaction of the one or more conditions is identified. A determination that the activity data and the sensor data satisfy the one or more conditions specified by the activity monitoring rule is made. The action specified by the activity monitoring rule is then performed in response to the determination.

22 Claims, 6 Drawing Sheets

400

```
┌─────────────────────────────────────────────────────────────┐
│  OBTAIN DATA INDICATING SCREEN ACTIVITY ON A COMPUTING DEVICE │
│                LOCATED WITHIN A PROPERTY                      │
│                                                         410   │
└─────────────────────────────────────────────────────────────┘
                              │
                              ▼
┌─────────────────────────────────────────────────────────────┐
│   OBTAIN SENSOR DATA COLLECTED BY A MONITORING SYSTEM         │
│              ASSOCIATED WITH THE PROPERTY                     │
│                                                         420   │
└─────────────────────────────────────────────────────────────┘
                              │
                              ▼
┌─────────────────────────────────────────────────────────────┐
│  PROCESS THE OBTAINED SCREEN ACTIVITY DATA USING ONE OR MORE  │
│                  PROCESSING TECHNIQUES                        │
│                                                         430   │
└─────────────────────────────────────────────────────────────┘
                              │
                              ▼
┌─────────────────────────────────────────────────────────────┐
│ DETERMINE THAT THE PROCESSED SCREEN ACTIVITY DATA SATISFIES   │
│              ONE OR MORE MONITORING RULES                     │
│                                                         440   │
└─────────────────────────────────────────────────────────────┘
                              │
                              ▼
┌─────────────────────────────────────────────────────────────┐
│   PERFORM ACTION SPECIFIED BY THE ONE OR MORE SATISFIED       │
│                    MONITORING RULES                           │
│                                                         450   │
└─────────────────────────────────────────────────────────────┘
```

OBTAIN ACTIVITY DATA INDICATING USAGE OF A COMPUTING DEVICE BY A USER WITHIN A PROPERTY OVER A PARTICULAR TIME PERIOD
510

OBTAIN SENSOR DATA COLLECTED BY A MONITORING SYSTEM THAT MONITORS THE PROPERTY OVER THE PARTICULAR TIME PERIOD
520

IDENTIFY AN ACTIVITY MONITORING RULE THAT SPECIFIES ONE OR MORE CONDITIONS AND AN ACTION TO PERFORM IN RESPONSE TO SATISFACTION OF THE ONE OR MORE CONDITIONS
530

DETERMINE THAT THE ACTIVITY DATA AND THE SENSOR DATA SATISFY THE ONE OR MORE CONDITIONS SPECIFIED BY THE ACTIVITY MONITORING RULE
540

PERFORM THE ACTION SPECIFIED BY THE ACTIVITY MONITORING RULE
550

FIG. 5

SCREEN FEED ANALYTICS

CROSS REFERENCE TO RELATED APPLICATION

This application claims the benefit of U.S. Provisional Pat. Application No. 62/513,513, filed on Jun. 1, 2017 and titled "SCREEN FEED ANALYTICS," which is incorporated herein by reference in its entirety.

TECHNICAL FIELD

This disclosure relates to wireless technology.

BACKGROUND

Wireless data transmission systems utilize an internet connection in transferring data between local clients and remote servers. For example, home security systems utilize internet connections provided by an internet service provider to upload bandwidth-intensive data such as security footage, which may lead to excessive Internet usage.

SUMMARY

Techniques are described for monitoring screen activity of a computing device and performing designated system actions based on the monitored activity. For example, techniques are described for applying monitoring rules that specify system actions to be performed by a monitoring system in response to determining certain information associated with screen activity. In some instances, if the monitored screen activity indicates that a user has performed a restricted action on a monitored device, the monitoring system may transmit an alert notification to a guardian device.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 4 is a flowchart that illustrates an example of a process for monitoring screen activity on a monitored device.

FIG. 5 is a flowchart that illustrates an example of a process for monitoring activity data on a computing device using an activity monitoring rule.

Like reference numbers and designations in the various drawings indicate like elements.

DETAILED DESCRIPTION

In general, techniques are described for monitoring screen activity of a computing device and performing various operations based on the monitored activity. For example, techniques are described for applying monitoring rules that specify actions to be performed by a monitoring system in response to determining certain information associated with screen activity. In some instances, if the monitored screen activity indicates that a user has performed a restricted action on a monitored device, the monitoring system may transmit an alert notification to a guardian device. The monitoring system may additionally, or alternatively, prevent the user from performing the restricted action on the monitored device, or prevent the user from performing any other associated actions on the monitored device. Implementations of the described techniques may include hardware, a method or process implemented at least partially in hardware, or a computer-readable storage medium encoded with executable instructions that, when executed by a processor, perform operations.

Figure 1:
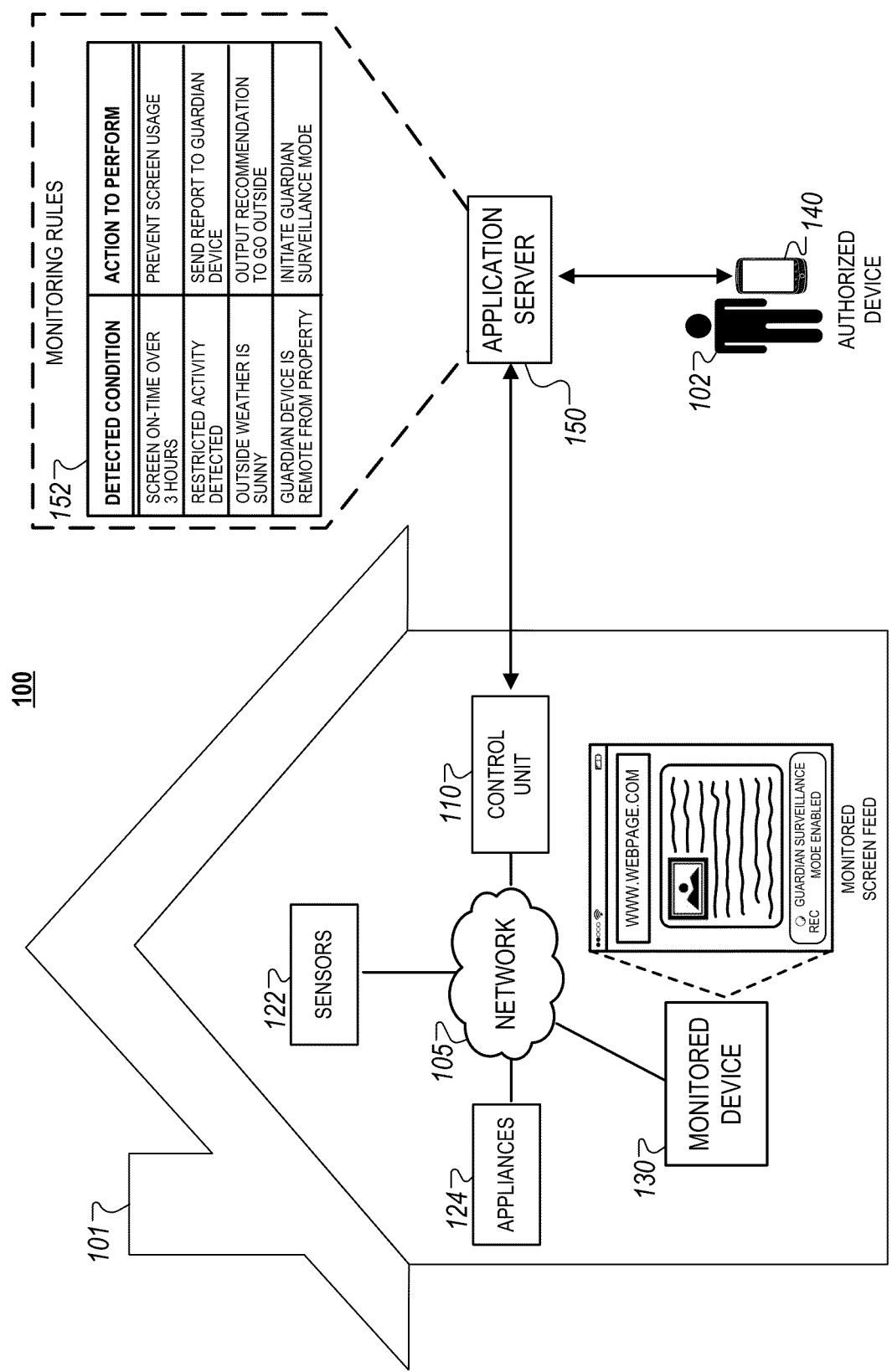
FIG. 1 is a block diagram that illustrates an example of a system.

FIG. 1 illustrates an example of a system 100 that may be configured to monitor screen activity of electronic devices and perform actions based on the monitored screen activity. The system 100 may include a network 105, a monitor control unit 110, sensors 122, appliances 124, a monitored device 130, a guardian device 140, and an application server 150.

In general, the system 100 allows an authorized user (e.g., a parent, a legal guardian, a temporary caretaker, etc.) to monitor the activity of a user (e.g., a minority individual, etc.) while he/she uses an electronic device. To accomplish this, the system 100 is capable of collecting screen activity data of a user device 130 while the device is being used by the user that is to be monitored. As described below, the screen activity data can be represented as screen capture images while a user device 130 is being used, or alternatively, as a video of a screen feed that is viewable to the user that is to be monitored.

The system 100 processes the screen activity data using various analysis techniques to determine if the processed screen activity data satisfies one or more monitoring rules specifying usage restrictions and/or limitations for the user to be monitored. For example, if a user is restricted from viewing certain types of content on the user device 130, the system 100 can determine that a monitoring rule has been violated if such content is detected within the screen activity data. In some implementations, the system 100 is capable to processing screen activity of the user device 130 and sensor data collected by the sensors 122 in determining whether activity on the user device 130 satisfies a monitoring rule.

For example, if screen activity data indicates that a user has accessed restricted content on the user device 130, the system 100 may also process sensor data associated with the property 101 (e.g., occupancy data, activity data, etc.) to verify if a monitoring rule has actually been violated. For instance, the system 100 may verify the type of user that accessed the restricted content, the conditions of the property 101 when the restricted content was accessed, and/or whether the user was actively using the user device 130 when the restricted content was accessed. In other examples, collected sensor data can be used to enhance user engagement on user device 130 by displaying certain information based on the conditions of the property 101 as indicated by sensor data collected by the sensors 122.

Referring now to the components of the system 100, the network 105 may be configured to enable electronic communications between devices connected to the network 105. For example, the network 105 may be configured to enable exchange of electronic communications between the monitor control unit 110, the sensors 122, the appliances 124, the monitored device 130, the guardian device 140, and the application server 150. The network 105 may include Local Area Networks (LANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), or other comparable technologies. In some examples, the network 105 may include wide area networks (WAN) of computers that receive services provided by a service provider.

The monitor control unit 110 may include a controller 112 and a network module 114. The controller 112 may be configured to control a monitoring system, such as a security system associated with a property that includes the monitor control unit 110. In some examples, the controller 112 may include a processor or other control circuitry configured to execute instructions of a program that controls operation of a security system. In these examples, the controller 112 may be configured to receive input from sensors, detectors, or other devices associated with the security system and control operation of components of the security system, such as a camera, a motion sensor, an alarm detector, an appliance, lights, etc. For example, the controller 112 may be configured to control operation of the network module 114 included in the monitor control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a short-range wireless network. The network module 114 also may be configured to exchange communications over the network 105 using a wireless connection. For instance, the network module 114 may enable the monitor control unit 110 to exchange communications with the application server 150 over the network 105 without the use of the network 105. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voiceband modem configured to enable the alarm panel to communicate over the telephone lines of Plain Old Telephone Systems (POTS). In some implementations, the alarm panel may be a broadband or cellular gateway where the network module 114 may enable the monitor control unit 110 to communicate over the network 105.

The monitor control unit 110 may communicate with the sensors 122, the appliances 124, the monitored device 130, the guardian device 140, and the application server 150 to wirelessly transmit data generated from the sensors 122, the appliances 124, the monitored device 130, and the guardian device 140 over the network 105. In some instances, the monitor control unit 110 may periodically receive data activity reports from the sensors 122 that include information related to the property (e.g., occupancy data, movement data, temperature data, etc.).

In addition, the monitor control unit 110 may periodically receive video and image footage of screen activity on the monitored device 130 that include information related to a user's activity on the monitored device 130. For example, video footage of screen activity can be used to determine applications used on the monitored device 130, content accessed while using the applications, user actions performed on the monitored device 130, among others. As described in reference to FIG. 2, the data obtained by the monitor control unit 110 can be used to apply a set of monitoring rules that specify actions to be performed by the monitoring system in response to determining that the screen activity data satisfies a condition associated with one or more monitoring rules.

The sensors 122 may include a contact sensor, a motion sensor, a glass break sensor, an occupancy sensor, or any other type of activity sensor included in a monitoring system or security system. The sensors 122 also may include an environmental sensor such as a temperature sensor, a water sensor, a rain sensor, a wind sensor, a light sensor, a smoke detector, a carbon monoxide detector, an air quality sensor, etc. In some instances, the sensors 122 may include a radio-frequency identification (RFID) sensor that identifies a particular article that includes a pre-assigned RFID tag.

The device 130 and the guardian device 140 may be any type of electronic device associated with a user that resides within the property 101. For example, the device 130 can be associated with a user whose device access is restricted and/or monitored (e.g., a child or adolescent user) and the guardian device 140 can be associated with an authorized user (e.g., a parent or a legal guardian) that restricts and/or monitors user access to the device 130. The devices 130, 140 may be smartphones, tablets, personal computers (PCs), network-enabled media players, home entertainment systems, cloud storage devices, and other types of network-enabled computing devices that are capable of exchanging data communication over the network 105. The devices 130, 140 may access a service made available by the application server 150 on the network 105, such as a mobile application. The data collected through the devices 130, 140 can be transmitted over the network 105 and used for various monitoring purposes as described below.

The device 130 may include a monitoring module 136 (not shown in FIG. 1) that is used to monitor screen activity of the monitored device 130. The monitoring module 136 can represent any suitable software module that is configured to capture user activity on the device 130 based on capturing screen activity. In some implementations, the monitoring module 136 is a software module that runs on the device 130 (e.g., a native application, an operating system process). Alternatively, in other implementations, the monitoring module 136 is a software module that runs on an external device that is associated with the device 130. For example, the monitoring module 136 can run on device that is connected to the device 130 using a wired (e.g., USB)

connection or wireless connection (e.g., Bluetooth, near-field communication (NFC), etc.). In such examples, the monitoring module 136 is capable of collecting screen activity data, user input data, and/or program activity on the device 130 through the wired or wireless connection with the device 130 without substantially using the computing and storage capabilities of the device 130.

The monitoring module 136 performs a screen capturing technique that collects screenshots of the device 130 as it is being used by a user. For example, the monitoring module 136 may perform image capturing techniques that collect a screenshot on the device 130 at specified time intervals (e.g., every second, every five seconds, etc.). In other examples, the monitoring module 136 may perform video capturing techniques that collects multiple frames per second such that the captured screenshot data is a video that represents screen activity over a specified time interval (e.g., ten seconds, ten minutes, etc.).

In some implementations, the monitoring module 136 is capable of performing various techniques to verify the identity of a user that uses the device 130. For example, the monitoring module 136 may require a user authentication prior to enabling use (e.g., biometric, password/passcode, facial, voice recognition, content analysis of content being accessed, etc.). In such implementations, the monitoring module 136 is capable of preventing a user from falsely using the device 130 as an authorized user to prevent the collection of screen activity monitoring data.

In some implementations, the device 130 can be remotely accessed, controlled, or adjusted by an authorized user through the monitoring module 136. In such implementations, the monitoring module 136 can be configured to receive and execute instructions corresponding to input received through a user device associated with an authorized user. For example, the authorized user may remotely power off the device 130, e.g., by controlling a power source of the device 130 using a Z-wave AC outlet switch. In other examples, the authorized user can deactivate the device 130, or certain functionalities of the device 130, based on adjusting the configuration of the device 130 through the monitoring module 136. For instance, a known local IP address assigned to the device 130 can be used to block Internet access on the device 130. In other instances, the monitoring module 136 can adjust the device 130 to operate in a mode where a user is only permitted to perform a set of limited functions, e.g., access specified applications. In some other instances, application server associated with a service provider may transmit an API instruction to the monitoring module 136 running as an application on the device 130 to execute instructions associated with services provided on the device 130, e.g., disabling cellular network connectivity for a specified period of time. In each of these instances, instructions can either be performed in an ad-hoc manner (e.g., based on manual instructions submitted by the authorized user) and/or in an automated fashion based on specified triggers and/or conditions associated with the instructions (e.g., enabling, reactivating, or resetting a device in the morning after it has been adjusted the night beforehand).

In some implementations, the device 130 can be other types of devices besides personal electronic computing devices such as smartphones, tablet computing devices, laptop computing devices, and the like. For example, the device 130 can be a display device (e.g., a television) that a user utilizes to watch electronic content such as television broadcasts, advertisements, and online electronic content streams. In such examples, the monitoring module 136 can be configured to monitor the electronic content accessed through the display device, user activity in relation to content that is being viewed, among others. In other examples, the device 130 can be a pass-through device (e.g., an analog or digital pass through device) that is used to capture screen activity on another device connected to the pass-through device. For instance, the device 130 can be an audio/video receiver that is configured to capture screen activity of a television that is connected to a cable television set-top box through the device 130 as a pass-through device.

Although FIG. 1 illustrates one of each device 130 and 140 within the system 100, in some implementations, the system 100 may additionally include a plurality of devices 130, 140 that periodically exchange communications over the network 105. For instance, the devices 130 may be monitored by the system 100 and associated with different user profiles of users whose device access is to be monitored and/or restricted using the system 100. The multiple devices 130 can be monitored as they are used in different regions of the property (e.g., bedroom, living room, kitchen, etc.) and configured to exchange communications with the sensors 122, the control unit 110, and/or the application server 150. In such implementations, the multiple devices 130 can each be individually monitored such that the system 100 is capable of tracking screen activity data for each device. For example, the system 100 may track screen on-time for each of the device 130, identify different users that use each of the devices 130.

As described in greater detail below, each of the multiple devices 130 can be associated with a different set of monitoring rules such that screen activity monitoring can be adjusted based on the associated monitoring rules. For example, if each of the multiple devices 130 is registered to a different user, then the system 100 is capable of applying different monitoring rules based on the user profile of a different user associated with each of the multiple devices 130. Additionally, if multiple user profiles are associated with each of the multiple devices 130, then the system 100 may apply different monitoring rules at various times of use based on determining the particular user that uses the client device when screen activity is monitored.

The application server 150 may be an electronic device configured to provide monitoring services for the property 101. The application server 150 may exchange electronic communications with the control unit 110, the sensors 122, the appliances 124, and the user devices 130, 140 over the network 105. For example, the application server 150 may obtain, store, and process screen activity data of the user device 130 from either the monitor control unit 110 or the user device 130 over the network 105. The application server 150 may also obtain data collected by the monitoring system of the property 101. For example, the application server 150 may obtain, store, and process sensor data collected by sensors 122 that are indicative of the environmental conditions within the property 101 during a time period when the screen activity is monitored on the user device 130.

The application server 150 may store a repository 152 including one or more monitoring rules that are applied by the system. The monitoring rules each include a detection condition associated with screen activity data collected from the user device 130, and an action to be performed by the system that corresponds to the detected condition.

As shown in FIG. 1, the monitoring rules can specify different types of actions that are performed in relation to screen activity monitoring. In some examples, the repository 152 includes monitoring rules that are associated with restricted user activity (e.g., viewing illicit content on the display of the user device 130, accessing a web pages that relate to inappropriate subject matter, or performing unauthorized actions on the user device 130). In such examples, the monitoring rules can specify the output of a notification to the user device 140 of the authorized user 103. In other examples, the repository 152 includes monitoring rules that are associated with excessive screen usage on the user device 130. In such examples, the monitoring rules can specify the transmission of instructions to the client device 130 to limit and/or restrict the user's access to the user device 130 (e.g., preventing device accessing for a certain period of time). In some other examples, the repository 152 includes monitoring rules that specify the initiation of certain monitoring operations during certain property conditions when the user is likely to access restricted content on the user device 130. In such examples, the monitoring rules can specify the execution of heightened monitoring operations (e.g., more frequent screen activity monitoring, enabling the sensors 122 to collect sensor data during time periods when the user accesses the user device 130, etc.).

The system 100 applies the monitoring rules within the repository 152 to perform actions that are responsive to specified conditions associated with the screen activity data. For example, the system 100 can apply monitoring rules to provide notifications to the user device 140 associated with the authorized user if the user is detected to access restricted content on the user device 130, as shown in the example illustrated in FIG. 2. In other examples, the system 100 can apply the monitoring rules to use sensor data collected by the sensors 122 to determine a present property condition and determine the appropriate notification technique, as shown in the example illustrated in FIG. 3A. In some other examples, the system 100 can apply the monitoring rules to detect excessive screen usage and provide notifications or other types of content for display on the user device 130 as a means of engaging with a user that is being monitored, as shown in the example illustrated in FIG. 3B. The system 100 can also apply the monitoring rules using other techniques than those that are not explicitly depicted in FIGS. 2, 3A, and 3B. In other examples, notifications are presented on the device 130 if the content that is being accessed through the device 130 are determined to be inappropriate for the user that is presently using the device 130 (e.g. presenting a warning notification if a child user is detected to be using the device 130 to access explicit content).

In some implementations, the repository 152 may additionally store data indicating a success rate associated with each monitoring rule include within the repository 152. In such implementations, the application server 150 may aggregate monitoring data from multiple properties where the monitoring rules are applied. The aggregated monitoring data may indicate, for example, patterns and/or trends associated with user activity in response to the application of a particular rule, e.g., decreased screen usage over a specified time period following the application of a monitoring rule that recommends that the user participate in an alternative activity, or detected user activity data within a property prior to, during, or after the application of a monitoring rule. The aggregated data can then be used to determine a set of predictive recommendations for authorized users within the property 101. For example, if a particular monitoring rule is indicated to have a high success rate, e.g., based on a high probability of a user performing a preferred action, then the system may provide an automated recommendation or a suggestion to apply the particular rule in response to detecting sensor data associated with the application of the particular rule. In this regard, aggregated sensor data and/or user activity data can be used to provide intelligent monitoring recommendations based on sensor data collected at a particular property.

As an example, the aggregate data can indicate that users' decreased usage of a video game console at multiple properties has increased physical activity by two hours after a monitoring rule that restricts screen activity on a monitored device. In this example, if the system 100 detects that a video gaming console is being excessively used, the system 100 may provide an authorized user with a recommendation to apply a monitoring rule that reduces screen activity on the device 130 along with an indication that the application of this monitoring rule may potentially increase the user's physical activity.

In some implementations, the repository 152 includes monitoring rules that correspond to and/or are applied in relation to a specific monitored user activity, e.g., homework completion, preset studying schedule, preset physical activity schedule, etc. In such implementations, monitoring rules can be selectively applied when sensor data collected by the sensors 122 indicates that the user is performing a certain activity associated with the monitoring user activity or some other type of detected condition that is associated with the monitored user activity, etc. a time associated with when a user is supposed to do homework, when a user is detected in the study, etc.

In some implementations, monitoring rules can also have varying degrees of applicability. For example, certain rules can be applicable to all occupants of the property such that they are applied regardless of the particular user that is using the device 130. For instance, a monitoring rule that imposes a threshold screen activity period can be applied regardless of the whether the user that presently uses the device 130 is an authorized user or a user to be monitored. In other examples, rules can be applied to individual users or groups of users such that the rules are only applied if a particular user (or a user that is included in a particular group of users) is presently using the device 130. For instance, a rule that is applicable to a user to be monitored can be disregarded or otherwise not applied if the user that is presently using the device 130 is an authorized user.

Figure 2:
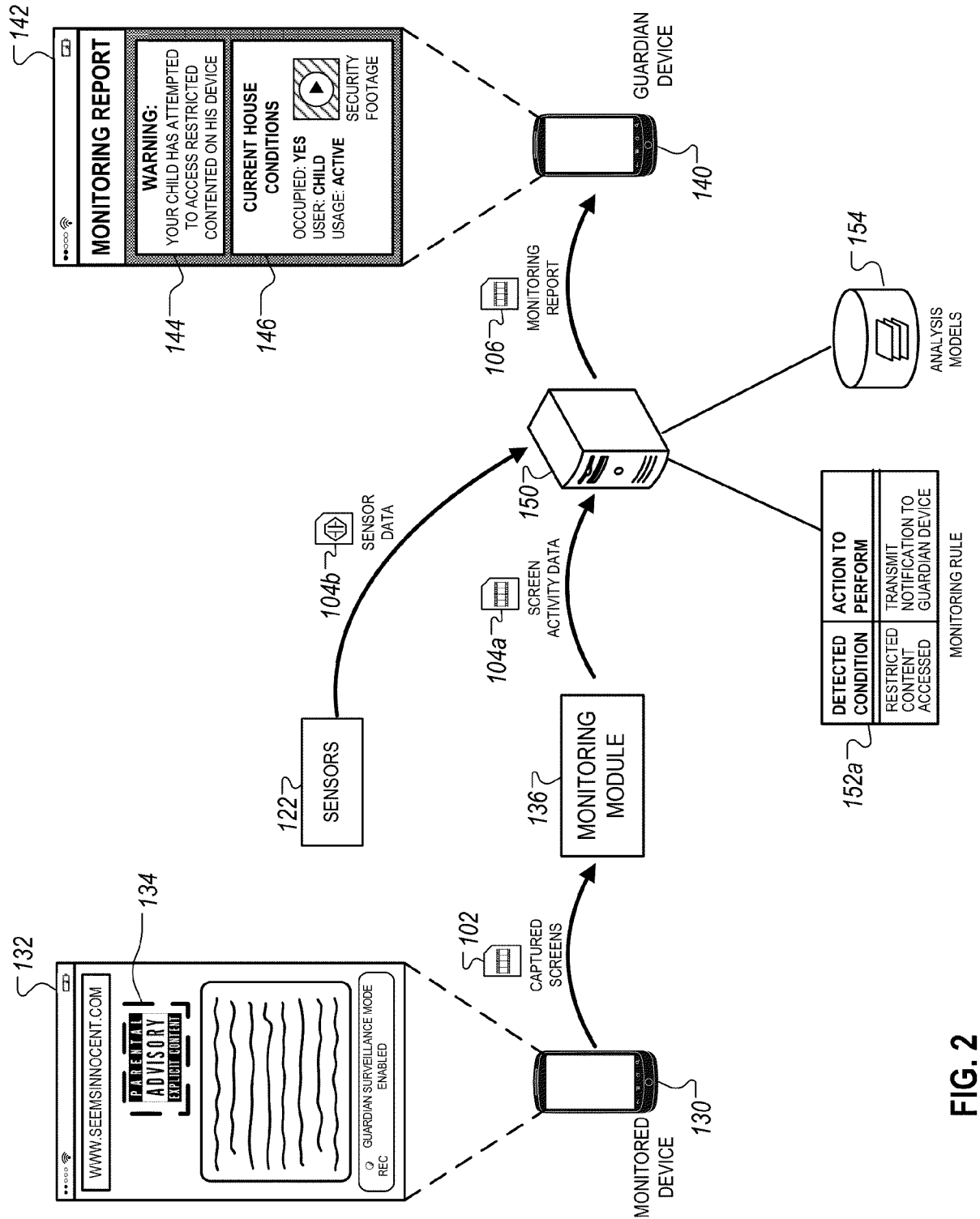
FIG. 2 is a conceptual diagram that illustrates a technique for monitoring screen activity of a user device.

In some implementations, the system 100 may periodically deliver activity reports to a device associated with the authorized user 101such the device 140. In such implementations, the activity reports can include both detected activity associated with the property 101 as well as screen activity collected on the monitored device 130. For example, as depicted in FIG. 2, a report can include both activity information associated with sensor data collected by the sensors 122 as well as information associated with the monitored screen feed provided for output on the device 130. In this regard, the reports that are periodically transmitted to the device 140 can include collected sensor data that is not attributable to activity associated with the monitored screen feed of the device 130 (e.g., alarm status of the property 101), as well as collected sensor data that is associated with monitored activity on the device 130 as described throughout. FIG. 2 is a conceptual diagram that illustrates a technique for monitoring screen activity on a device. In the example depicted, a system (e.g., the system 100 depicted in FIG. 1) transmits notifications to an authorized user associated with the user device 140 based on determining that a user has accessed restricted content 134 on an interface 132 provided for output on the user device 130. To accomplish this, the system collects screen activity data and sensor data, processes the collected data in relation to a set of monitoring rules, and determines that the monitoring rule has been satisfied, as described in detail below.

As shown in FIG. 2, the monitoring module 136 may collect and process screen capture data 102, which includes data representing screen activity on the user device 130. As described above, the monitoring module 136 can either be a software module that runs on the user device 130 (e.g., a native application or an operating system process that runs on the user device 130), or a software module that runs on an external device that is connected to the user device 130 over a wired or wireless connection (e.g., a device that is physically connected to the user device 130 over a communication module, or a device that is connected to the user device 130 over a Bluetooth connection). The captured screen data 102 can include a series of screenshots that are captured at certain time intervals (e.g., screenshots captured every five seconds), or a video feed includes frames that represent movement on the display of the user device 130. The screen capture data 102 is provided for output to the application server 150 as screen activity data 104a.

The application server 150 obtains the screen activity data 104a from the monitoring module 136 and sensor data 104b collected by the sensors 122. As described above, the sensor data 104b can include, for example, activity data, occupancy data, temperature data, or any other type of sensor data that is descriptive of the condition of a property (e.g., the property 101) where the user device 130 is located when the captured screen data 102 is collected. As described in detail below with respect to FIG. 3B, the obtained sensor data 104b can be used to identify an environmental context associated with user device 130 when the captured screen data 102 is collected by the monitoring module 136.

In some implementations, the screen activity data 104a can additionally, or alternatively, include data associated with screen activity that is visualized within the screen activity data 104a. For example, the screen activity data 104a can include user interaction data indicating user inputs provided by the user while using the user device 130 (e.g., text input provided, gesture input provided, amount of time spent using a particular application, etc.). In other examples, the screen activity data 104a includes application data and/or device data collected on the user device 130 while a user accesses the user device 130 (e.g., application services invoked by an application running, active or background processes, etc.). In such implementations, the data associated with the visualized screen activity can be used to predict a context associated with the user that accesses the user device 130, which can thereby be applied to determine if one or more monitoring rules have been satisfied as discussed above.

The application server 150 processes the screen activity data 104a and sensor data 104b in related to a set of monitoring rules (e.g., the monitoring rules in the repository 152) and with the use of analysis models 154. For example, the application server 150 may use the analysis models 154 to extract information from the obtained screen activity data 104a. The application server 150 then determines whether the extracted information satisfies one or more mores rules within the repository 152.

The analysis models 154 can include a text analysis module that uses natural language processing to identify terms that are displayed on the screen of the user device 130. In this example, the text analysis module can be applied to detect the occurrence of terms that are considered to be derogatory terms. In another example, the analysis models 154 includes a web activity analysis model that analyzes the subject matter associated with web pages accessed by the user on the user device 130. In this example, the web activity analysis model is applied to determine if the user has accessed a restricted webpage that includes explicit content. In yet another example, the analysis models 154 includes an image/video analysis model that uses object detection, recognition and/or classification techniques to identify the presence of content items that are presented to the user. In this example, the image/video analysis model can be applied to determine if the user has viewed, for instance, video depicting violence on the display of the user device 130.

As described above, the rules within the repository 152 can include rules that specify types of restricted content that can be accessed on user device 130 (e.g., web pages that present derogatory information, multimedia that include illicit material). The repository 152 can also include rules that specify certain types of activity patterns that indicate excess screen usage (e.g., a threshold period of time for which the screen of the user device 130 has been turned on). In some other examples, the repository 152 includes rules that specify certain susceptible property conditions under which the user is likely to be unsupervised (e.g., presence of user devices associated with authorized users within the property).

In the example depicted in FIG. 2, the application server 150 uses an image analysis model to determine that the screen activity data 104a indicates that restricted content 134 was accessed by the user on the user device 130. The application server 150 determines that the presence of restricted content 134 within the screen activity data 104a satisfies a monitoring rule 152a. In response, the application server 150 transmits a monitoring report 106 to the user device 140.

As shown in FIG. 2, the monitoring report 106 includes a notification 144 indicating that the system has determined that the user has accessed restricted content on the user device 130. The monitoring report 106 also includes a notification 146 that allows an authorized user to view information associated with the property during a time period when the screen activity data 104a was collected. The property information included within the notification 146 can be identified based on the sensor data 104b collected by the sensors 122. As depicted, the property information indicates that, when the restricted content 134 was accessed on the user device 130, the property was unoccupied, the user accessing the user device 130 was a child, and the type of access was active access when the restricted content 134 was accessed. The notification 146 also enables the authorized user to view security video footage of the user while he/she was determined to access the restricted content 134. In this regard, the notification 146 enables the authorized user to verify activity captured in the security footage in determining how the user accesses the restricted content 134 on the user device 130.

Figure 3A:
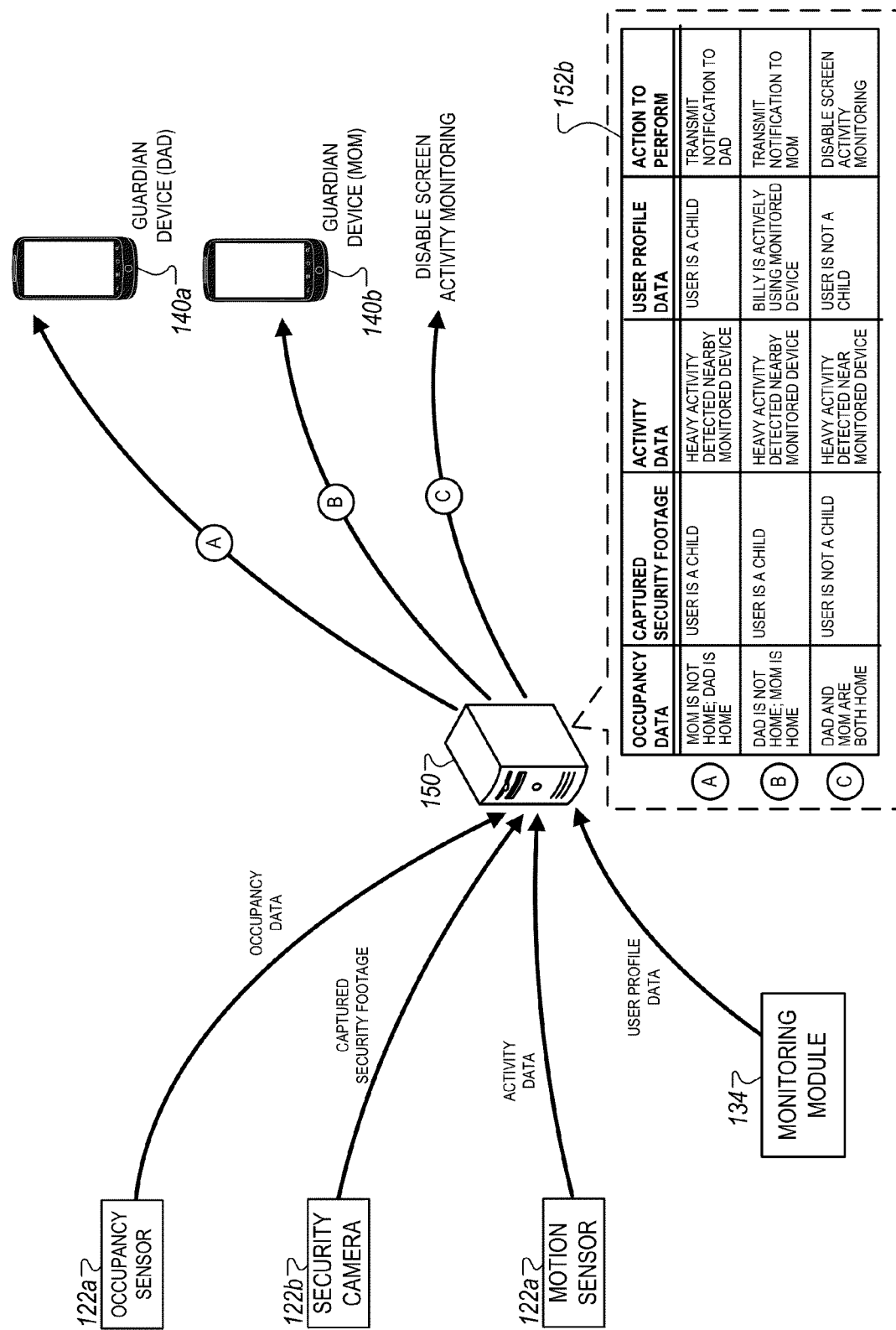
FIG. 3A is a conceptual diagram that illustrates an example of a technique for adjusting screen activity monitoring of a monitored device based on sensor data collected by a monitoring system of a property.

FIG. 3A is a conceptual diagram that illustrates an example of a technique for adjusting screen activity monitoring of a mobile device based on sensor data collected by a monitoring system of a property. In the example depicted, a system (e.g., the system 100) uses different types of sensor data associated with a property where a user device is located (e.g., the property 101) in order to adjust different aspects of monitoring. Although the depicted example illustrates an adjustment to notifications that are provided for output, the system is capable of performing other types of adjustments are described in detail below.

As shown in FIG. 3A, the sensor data obtained by the application server 150 includes occupancy data collected by an occupancy sensor 122a, captured security footage collected by a security camera 122b, and activity data collected by a motion sensor 122c. The application server 150 also obtains user profile data identified by the monitoring module 136.

The occupancy sensor 122a, the security camera 122b and the motion sensor 122c can represent sensors that are included within the sensors 122 placed within a property (e.g., the property 101). In the example depicted, each type of sensor data is collected during a period of time that is associated with the collection of screen activity data on the user device 130. For example, occupancy data can be collected prior to or during a time period when the user actively uses the user device 130. In this example, the occupancy data can be used to determine if the property is occupied when the user actively uses the user device 130.

The captured security footage can include a field of view that includes the user device 130 to, for example, verify that a user associated with the user profile data obtained from the monitoring module 136 is actually using the user device 130 when the screen activity monitoring takes place. In another example, the captured security footage can identify various types of context data associated usage of the user device 130 (e.g., whether there are other individuals present when the user device 130 is being used, whether the user device 130 is being actively used or the device remains idle as the user participates in another activity, etc.).

The activity data can include information relating to detected motion within specified regions of the property prior to or during a time period when screen activity of the user device 130 is monitored. For example, the activity data can be used to determine if there is significant motion before a screen activity data (e.g., indicating presence of other individuals while the screen activity is being monitored).

The user profile data can be used to identify a user that uses the user device 130 when its screen activity is being monitored. For example, as described above, in some implementations, multiple users that are associated with the user device 130 can each have a user profile that includes user attributes (e.g., age, gender, etc.), past user activity data (e.g., web browsing history, applications accessed, etc.), and user preferences associated with the user device 130. In such implementations, the user can be requested to log into his/her user profile prior to using the user device 130, such that screen activity data that is monitored is associated with a specific user.

As shown in FIG. 3A, the application server 150 processes the obtained sensor data and user profile data to determine whether to generate and alarm condition to provide notifications and a user device to provide notifications if the screen activity data satisfies one or more monitoring rules. As depicted, the application server 150 identifies different conditions associated with a property based on information indicated within the obtained sensor data. In this example, the application server 150 adjust the notification output in three different scenarios indicated by the obtained sensor data, which is included in table 152b. The table 152b includes information descriptive of the condition of the property before or during screen activity monitoring.

In scenarios (A) and (B), the application server 150 determines an appropriate user device to transmit a notification that a user has been detected to have accessed restricted content on the user device 130 (e.g., based on processing screen activity data as described above). For example, in scenario (A), the occupancy data indicates that "MOM IS NOT HOME" but that "DAD IS HOME," and in response, the application server 150 provides a notification for output to a guardian device 140a associated with "DAD." Alternatively, in scenario (B), the occupancy data indicates that "DAD IS NOT HOME" but that "MOM IS HOME," and in response, the application server 150 provides a notification for output to a guardian device 140a associated with "MOM." In these examples, the application server 150 is configured to provide notifications to one or more user devices based on an authorized user being determined to be present within the property while a user is determined to access restricted content on the user device 130.

In scenario (C), the application server 150 determines not to provide a notification for output and disable screen activity monitoring based on determining that the user device 130 is currently being used by a user that is not a user to be monitored by the system (e.g., another authorized user). For instance, the system, in this example, is configured to monitor a single user "BILLY." The captured security footage indicates that the user device 130 is not being used by a child and the user profile data indicates that the user device 130 is not being used by "BILLY," and in response, the application server 150 determines that screen activity monitoring should be disabled since a user to be monitored is not currently using the user device 130. In this example, the application server 150 is therefore capable of using externally collected data within the property to verify whether screen activity monitoring should actually be performed regardless of whether restricted activity is detected.

In some implementations, the application server 150 can adjust screen activity monitoring using obtained sensor data in various other ways than depicted in FIG. 3A and described above. For example, the application server 150 can use sensor data to verify whether restricted content detected within screen activity data has actually been actively accessed by a user to be monitored as opposed to being provided on the user device 130 as a pop-up that the user does not actually access. In this example, captured security footage and activity data collected prior to or during a time period when screen activity is monitored can be used to determine, for instance, how active the user has been within the property before the restricted content was detected and/or identify other types of user behaviors (e.g., whether the user is attentive to the screen or whether the content is run in the background).

In another example, if multiple user devices 130 are present within the property, the application server 150 can use activity data and occupancy data to selectively enable screen activity monitoring based on tracking movement within the property in relation to known locations of the multiple user devices 130 (e.g., detecting motion detected in hallway near a user device 130, and enabling screen activity monitoring on the user device 130 based on the detected motion).

In yet another example, sensor data obtained in relation to collected screen activity data (e.g., sensor data collected prior to or during screen activity monitoring) can be stored within a repository that associates stored sensor data and a user profile for the collected screen activity data. In this example, the system can compute various activity statistics for a user profile (e.g., average daily screen usage, percentage of detected activity level that represents screen usage, frequent times of screen usage, etc.). The system can also compare the computed activity statistics to other types of monitoring system data (e.g., set point temperature adjustments, energy consumption within the property, etc.) to identify trends in property usage that is associated with, or attributable to, screen usage on user devices. In other examples, captured screen data can be used to classify different types of usage on the device 130. For instance, time spent on different activities (e.g., video games, social media, educational activities, etc.) can be tracked to determine the different types of usage of the device 130. In this example, monitoring rules specifying different usage thresholds can be associated with each type of usage such that usage classifications can be used to obtain granular information associated with user activity on the device 130 (e.g., distinguishing between excessive device usage for educational activities versus excessive device usage for social media or video games).

In addition, the system may be capable of collecting sensor data and screen activity data from multiple properties to enable various data aggregation and comparison capabilities. For example, the system may be capable of determining screen activity statistics for a region (e.g., a local municipality) based on aggregating screen activity data obtained from monitoring systems of properties located within the region. The system may be capable of comparing the screen activity data obtained from a monitoring system of a property to aggregated screen activity data for a region including the property to provide users of the property with information on screen activity usage (e.g., type of content accessed, amount of screen usage, time periods associated with screen usage, etc.).

Figure 3B:
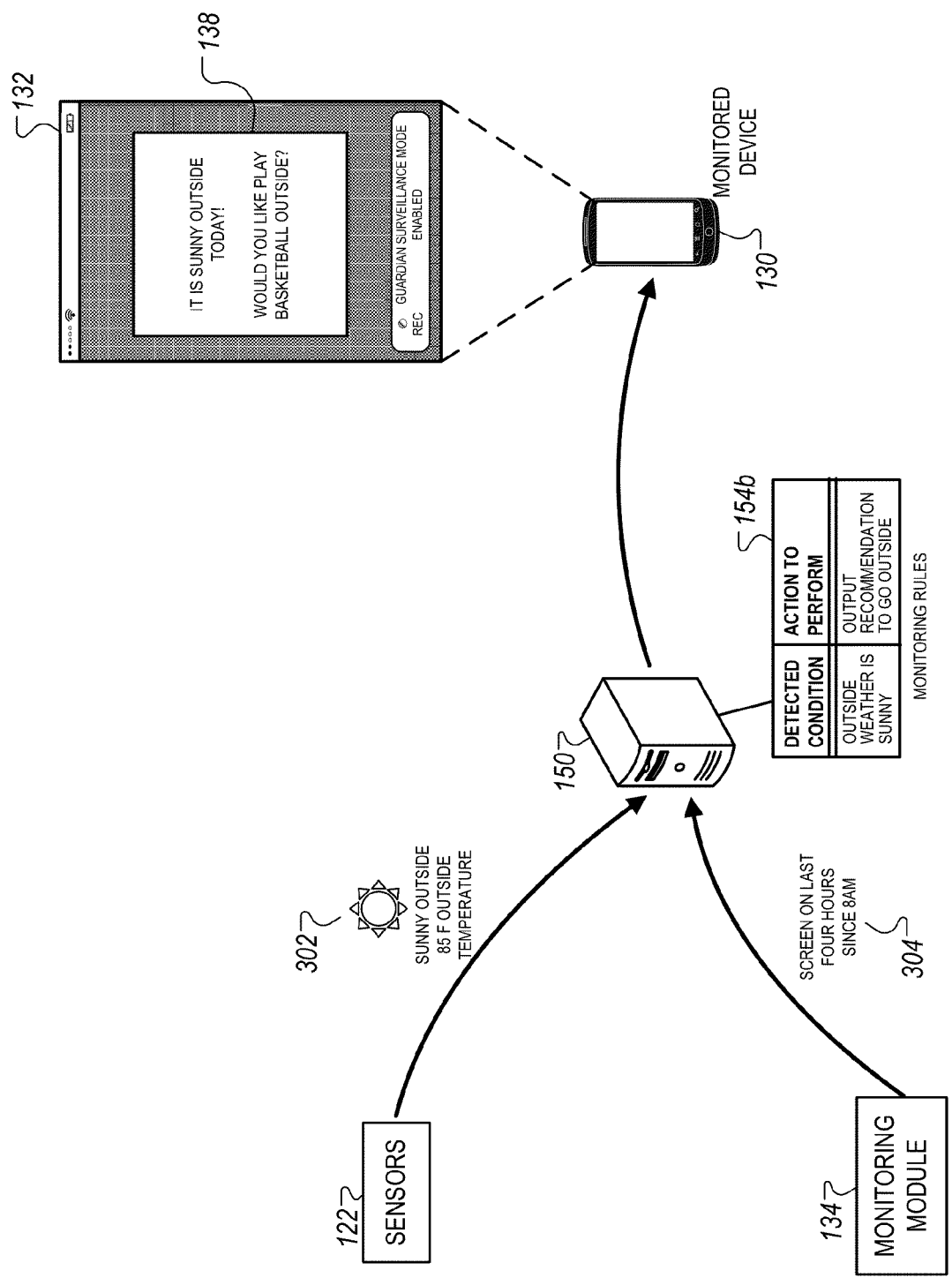
FIG. 3B is a conceptual diagram that illustrates an example of a technique for using external environmental data to provide interactive content provided for output on a monitored device.

FIG. 3B is a conceptual diagram that illustrates an example of a technique for using external environmental data to display interactive content provided for output on a monitored device. In the example depicted, a system (e.g., the system 100 depicted in FIG. 1) uses sensor data 302 associated with a property where the user device 130 is located (e.g., the property 101) perform an action specified by a monitoring rule 154b. In this example, the system is capable of processing sensor data 302 in relation to screen activity data 304 to determine that the monitoring rule 154b has been satisfied, and in response perform an action specified by the monitoring rule 154b.

As shown in FIG. 3B, the sensor data 302 indicates that a weather sensor included within the sensors 122 has determined that the ambient weather condition outside the property is sunny with a temperature of 85° F. In this example, the screen activity data 304 collected by the monitoring module 136 also indicates that a user has been actively using the user device 130 for the past four hours.

The application server 150 processes the information contained within the sensor data 302 and the screen activity data and determines that the obtained data satisfies the condition for a monitoring rule 154b included within the repository 152. The monitoring rule 154b specifies a system action of providing a recommendation for the user to go outside if the ambient weather conditions are sunny. In response to determining that the condition of the monitoring rule 152b has been satisfied, the application server 150 performs the specified action and transmits an instruction to the monitoring device 130 to provide a notification 138 for output on the user interface 132.

In some implementations, the recommendation in the example above can additionally or alternatively be provided for output in response obtaining additional sensor data. For example, the air quality outside the property can be checked in order to determine, for instance, whether a recommendation to go outside should be provided for output and/or whether the screen of the device 130 should be disabled to prevent the user from further using the device 130. In this example, recommendations can be adjusted based on screen data, weather conditions, and/or other safety conditions related to the external environment of the property.

The notification 138 provides a suggestion to the user to consider going outside to participate in a sporting activity instead of staying indoors and continuing to use the user device 130. This example illustrates the system's capability to use the screen activity monitoring techniques, as described throughout, as a means to provide proactive notifications that can potentially limit excessive usage of an electronic device. For instance, by collecting and processing both the sensor data 302 and the screen activity data 304, the system is able to identify real-time external conditions in relation to device usage in order to provide recommendations to reduce dependence on electronic devices, and attempt to engage the user to participate in a sporting event outdoors.

In some implementations, the notification 138 can additionally or alternatively be used to suggest and/or recommend an alternative activity on the user device 130 to the activity that is being performed on the user device 130. For example, if the user is restricted from performing a particular action on the user device 130 (e.g., accessing the Internet), but allowed to use the user device 130 to perform other permissible actions, the notification 138 may provide a recommendation to, for instance, use an educational or learning application that runs on the user device 130. In other examples, the notification 138 can be used to improve social engagement between users that use monitored devices of different systems. For instance, in the example depicted in FIG. 3B, the system may additionally transmit a notification to a user device associated that is associated with the user device 130, e.g., a neighbor child that is a friend of the user of the user device 130. The notification can, for example, provide a similar recommendation to play outside or suggest that the two neighbors participate in a physical activity together instead of staying indoors in their respective homes.

In some implementations, monitoring rules can be applied for different weather patterns in a similar manner as depicted in FIG. 3B. In such implementations, the monitoring rules can be used to predict that a user may prefer to perform an outdoor activity as opposed to remaining indoors to use the monitored device 130. For example, a monitoring rule that indicates that it has snowed outside can be used to provide a notification that suggests performing a winter-related activity such as snowboarding, skiing, among others. In other examples, the monitoring rules can specify preferred parameter ranges that indicate a high likelihood that a user will be able to perform outdoor activity, such as a temperature range, a humidity range, a likelihood of precipitation, among others. In such examples, the notification 138 can be presented on the monitored device 130 even if the weather is not sunny. For instance, if the weather outside is cloudy, but the temperature range is between 55 and 66° F. and there is less than a five percent chance of precipitation, then the system 100 can still determine that the user can perform an outdoor activity.

FIG. 4 is a flowchart that illustrates an example of a process 400 for monitoring screen activity on a user device. For convenience, the process 400 will be described as being performed by a system of one or more computers located in one or more locations. For example, the system 100, or one or more components of the system 100 (e.g., the monitoring module 136, the monitor control unit 110, the application server 150), appropriately programmed in accordance with this specification, can perform the process 400. The descriptions below are provided in reference to the application server 150 for simplicity.

Briefly, the process 400 can include obtaining screen activity data of a user device located within a property (410), obtaining sensor data collected by a monitoring system of the property (420), processing the obtained screen activity data and the obtained sensor data using one or more analysis techniques (430), determining that the processed data satisfies one or more monitoring rules (440), and performing an action specified by the one or more satisfied monitoring rules (450).

In more detail, the process 400 can include the operation of obtaining screen activity data of a user device located within a property (410). For example, the application server 150 may obtain screen activity data 104a collected by the monitoring module 136 based on activity on a display of the user device 130 as depicted in FIG. 2. As described above, in some implementations, the obtained screen activity data 104a can include a sequence of images that were collected over a specified period of time of usage (e.g., every three seconds over a ten-minute time period of device usage). Alternatively, the obtained screen activity data 104a can include video data that includes multiple frames representing screen activity on the user device 130.

In some implementations, the screen activity data 104a can additionally, or alternatively, include data associated with screen activity that is visualized within the screen activity data 104a. For example, the screen activity data 104a can include user interaction data indicating user inputs provided by the user while using the user device 130 (e.g., text input provided, gesture input provided, amount of time spent using a particular application, etc.). In other examples, the screen activity data 104a includes application data and/or device data collected on the user device 130 while a user accesses the user device 130 (e.g., application services invoked by an application running, active or background processes, etc.). In such implementations, the data associated with the visualized screen activity can be used to predict a context associated with the user that accesses the user device 130, which can thereby be applied to determine if one or more monitoring rules have been satisfied as discussed above.

The process 400 can include the operation of obtaining sensor data collected by a monitoring system of the property (420). For example, the application server 150 may obtain sensor data 104b collected by sensors 122 of a monitoring system of a property (e.g., the system 100 of the property 101) as depicted in FIG. 2. As described above, the sensor data 104b may include, for example, occupancy data, activity data, captured security footage, temperature data, weather data, among others. The application server 150 may process the sensor data 104b to determine a present condition of the property. For example, the application server 150 may determine whether the property is presently occupied by a user to be monitored and/or an authorized user, regions of the property that have detected activity, regions of the property where the user device 130 is presently located, ambient temperature within the property, weather conditions outside the property, among others.

The process 400 can include the operation of processing the obtained screen activity data and the obtained sensor data using one or more analysis techniques (430). For example, the application server 150 may process the screen activity data 104a and the sensor data 104b using the analysis models 154. As described above, the analysis models 154 can specify data processing techniques used to extract information from the screen activity data 104a that is used to determine if one or more monitoring rules within the rule repository 152 are applicable to the screen activity data 104a. The analysis models 154 can include, for example, a text analysis model, a web activity model, an image/video analysis model, among others. Each of the analysis models 154 can be applied to determine if certain the user has accessed restricted content on the user device 130 and/or if content provided for display on the user device 130 is inappropriate even though the user unintentionally accessed the displayed content. In this regard, the system is capable of applying multiple analysis models 154 to identify different types of user activity information on the user device 130 (e.g., type of content displayed, the method by which the displayed content was accessed, or actions taken by the user before or after the content was accessed).

The process 400 can include the operation of determining that the processed data satisfies one or more monitoring rules (440). For example, the application server compares the user activity information extracted from the screen activity data 104a in step 430 to one or more conditions specified by monitoring rules included within the rule repository 152 to determine if one or more of the monitoring rules have been satisfied. As described above, the rules within the repository 152 can include rules that specify types of restrict content that can be accessed on user device 130 (e.g., web pages that present derogatory information, multimedia that include illicit material). The repository 152 can also include rules that specify certain types of activity patterns that indicate excess screen usage (e.g., a threshold period of time for which the screen of the user device 130 has been turned on). In some other examples, the repository 152 includes rules that specify certain susceptible property conditions under which the user is likely to be unsupervised (e.g., presence of user devices associated with authorized users within the property).

In some implementations, the determination that the screen activity data 104a satisfies one or more monitoring rules included with the repository 152 is adjusted and/or augmented based on processing contents of the obtained sensor data 104b. As described above, in some implementations, the sensor data 122 is used to verify whether the user has actually accessed restricted content on the user device 130. For example, captured security footage that includes a view of the user device 130 being used when restricted content has been determined to have been accessed on the user device 130 can be used to identify the user that accessed the restricted content and/or whether the user was actively using the user device 130 when the content was accessed. In another example depicted in FIG. 3A, activity data indicating that the user that accesses the content is not a user that is to be monitored (e.g., a child), the system prevents the determination that a monitoring rule has been satisfied.

The process 400 can include the operation of performing an action specified by the one or more satisfied monitoring rules (450). For example, once the application server 150 has determined that information within the screen activity data 104a satisfies one or more monitoring rules within the repository 152, the application server 150 performs an action (or transmits an instruction to perform an action) specified by the one or more satisfied rules. For example, as depicted in the example of FIG. 2, in response to determining that the monitoring rule 152a has been satisfied, the application server 150 transmits the alert notification 144 to the user device 140 of an authorized user. In the example depicted in FIG. 3A, the application server 150 transmits a notification to the appropriate user that is determined to be present within the property based on obtained occupancy data. In the example depicted in FIG. 3B, the application server transmits a notification 138 for display on the user device 130 based on determining that the monitoring rule 152b has been satisfied.

FIG. 5 is a flowchart that illustrates an example of a process 500 for monitoring activity data on a computing device using an activity monitoring rule. Briefly, the process 500 can include the operations of obtaining activity data indicating usage of a computing device by a user within a property over a particular time period (510), obtaining sensor data collected by a monitoring system that monitors the property over the particular time period (520), identifying an activity monitoring rule that specifies one or more conditions and an action to perform in response to satisfaction of the one or more conditions (530), determining that the activity data and the sensor data satisfy the one or more conditions specified by the activity monitoring rule (540), and performing the action specified by the activity monitoring rule (550).

In general, the process 500 is described below in reference to the system 100, although other types of monitoring systems can be configured to perform the operations of the process 500. For example, a system that monitors user activity on a computing device can be configured to apply an activity monitoring rule in a similar manner as described below. In this example, the activity monitoring rule can be determined based on activity data collected on monitored devices, data collected by sensors placed in a property, or certain conditions within a property.

Additionally, the operations of the process 500 can be performed by a single component of the system 100 (e.g., the application server 150), or alternatively, by multiple components of the system 100 (e.g., the application server, the control unit 110, and the guardian device 140). For example, the application server 150 can obtain activity data of the monitored device 130 and data collected by the sensors 122 over the network 105, identify an applicable activity monitoring rule within the repository 152, determine that the obtained activity data and the sensor data satisfy the applicable monitoring activity rule, and provide a notification to the guardian device 140. In another example, the activity data and the sensor data can instead be received by the control unit 110 over a LAN associated with the property 101. In this example, the control unit 110 can locally store data identifying the monitoring rules within the repository 152 in order to identify an applicable activity monitoring rule that is satisfied by the obtained activity data and sensor data. Based on this determination, the control unit 110 can provide a communication to the application server 150, that then performs the action specified by the monitoring activity rule identified by the control unit 110 as being satisfied by the activity data and sensor data. For instance, the action could involve the application server 150 providing a notification to the guardian device 140 through the Internet. The descriptions below are in reference to the application server 150 performing the operations of the process 500 for simplicity and brevity.

In more detail, the process 500 can include the operation of obtaining activity data indicating usage of a computing device by a user within a property over a particular time period (510). For example, the application server 150 can obtain activity data indicating usage of the monitored device 130 within the property 101 over a particular time period (e.g., one hour, one day, etc.). The activity data can include information that indicates, for instances, activities performed by a user on the monitored device 130 (e.g., applications accessed, time spent on accessed applications, etc.), content accessed through the monitored device 130 (e.g., webpages accessed through a browser applications, multimedia streamed through a content streaming application, videos accessed through a web content streaming webpage), among other types of usage information, such as external users that the user may have attempted to contact online or by phone.

As discussed above, in some implementations, the activity data can include a screen feed of the monitored device 130. In such implementations, the screen feed may be a video representing viewpoint of a screen of the monitored device 130 that a user accessing the monitored device 130 sees as he/she is accessing the monitored device 130. In some instances, the activity data can be accessed in real-time (or substantially in real-time) such that activity on the monitored device 130 can be remotely monitored by, for example, the control unit 110, the application server 150, or the guardian device 140 as a user accesses the monitored device 130. For example, the authorized user 103 can access an application on the guardian device 140 that provides him/her with a real-time screen feed of the monitored device 130 as the device is being used by a monitored user (e.g., a child) inside the property 101.

The process 500 can include the operation of obtaining sensor data collected by a monitoring system that monitors the property over the particular time period (520). For example, the application server 150 can obtain sensor data collected the system 100 that monitors the property 101 over a particular time period. The obtained sensor data can include data collected by the sensors 122 that represent, for example, present conditions inside the property 101, user activity within the property 101, configurations/operational statuses of the appliances 124, among others. As some examples, the obtained sensor data includes an alarm status of a security system of the property 101, video data collected by security cameras placed inside the property 101, presence data indicating locations of the property 101 that are occupied by users inside the property 101, motion sensor data indicating regions of the property where there is detected movement, among others.

In some implementations, the obtained sensor data can include video data that provides a visual indication of a user as he/she is presently using the monitored device 130 inside the property 101 during the particular time period. For example, the video can be collected by a security camera placed inside a living room where a user is presently accessing the monitored device 130. In this example, the video data can be used to verify, for example, the user that is actually accessing the monitored device 130 and is associated with the activity data received in step 510, and environmental information within the property 101 that are associated with the activity data. For instance, if the activity data identifies that a "User A" is accessing the monitored device 130 because his/her user account is presently logged into the monitored device 130, then the video data can be used to confirm whether "User A" is actually the individual that is accessing the monitored device 130. For instance, if "User B" accesses the monitored device 130 through "User A's" account, then the application server 150 can confirm that "User B" and not "User A" is presently accessing the monitored device 130.

The process 500 can include the operation of identifying an activity monitoring rule that specifies one or more conditions and an action to perform in response to satisfaction of the one or more conditions (530). For example, the application server 150 can identify an activity monitoring rule from among monitoring activity rules that are referenced in the repository 152. As discussed above, the monitoring activity rule can specify one or more conditions associated with usage of the monitored device 130 and an action to perform in response to satisfaction of the more conditions. For example, the detected condition can be that activity data indicates that a user has used the monitored device 130 for over three hours (based on a screen of the monitored device 130 being turned on for more than three hours). In this example, the action to perform can include disabling the screen to prevent screen usage of the monitored device 130.

In some implementations, the activity monitoring rule can include multiple conditions that are associated with a single action to perform, or alternatively, multiple actions to be performed in association with a single condition being satisfied. In this regard, the activity monitoring rule can combine multiple conditions to more closely identify a certain type of user activity/behavior that is determined to satisfy the monitoring activity rule and trigger an action to be performed in response. For example, an activity monitoring rule can specify as conditions that the screen of the monitored device 130 has been turned on for a threshold period of time (e.g., three hours) and outside weather as being sunny. In this example, the combination of conditions can be used to identify opportunities for a user to be doing outdoor-related activities instead of staying inside and only accessing the monitored device 130. The action to perform might therefore be a notification provided for output on the monitored device 130 recommending that the user tries an outdoor activity. In other instances, an activity monitoring rule can specify multiple actions to perform in response to satisfaction of a single condition. For example, in response to a condition that a user has accessed restricted content on the monitored device 130, the activity monitoring rule can specify a first action to disable further access to the monitored device 130 and a second action to provide a notification to the guardian device 140 of the authorized user 103. In this example, the application server 150 applies a single activity monitoring rule to achieve two monitoring objectives - preventing further access to restricted content on the computing device 130 and reporting suspicious activity to an authorized user.

The process 500 can include the operation of determining that the activity data and the sensor data satisfy the one or more conditions specified by the activity monitoring rule (540). For example, the application server 150 can process the activity data and the sensor data to determine that one or more conditions of the activity monitoring rule have been satisfied. The processing may be performed in real-time such that satisfaction of the activity monitoring rule can be determined after a minimal delay (e.g., 2-3 ms) of, for instance, a user having performed an action that satisfies the conditions. For example, if a user accesses a restricted webpage, then application server 150 may receive an indication that the webpage accessed through the monitored device 130 and determine that an activity monitoring rule related to restricted actions has been satisfied based on identifying the webpage as including explicit content. As another example, the application server 150 can track one or more usage statistics of the monitored device 130 (e.g., total screen on-time, number of words typed on a keyboard associated with the monitored device 130, phone numbers contacted using the monitored device 130, application usage on the monitored device 130) and determine when a monitored usage statistic satisfies an activity monitoring rule.

The process 500 can include the operation of performing the action specified by the activity monitoring rule (550). For example, the application server 150 can perform an action specified by an activity monitoring rule in response to determining that the activity data and/or the sensor data satisfy one or more conditions of the activity monitoring rule. For instance, in response to determining that the screen of the monitored device 130 has been on for greater than three hours over a six-hour time frame, the application server 150 can perform the specified action of preventing further screen usage by disabling a user's access to the monitored device 130. In this example, the application server 150 can provide instructions to an associated application installed on the monitored device 130 that, when instructed by the application server 150, disables access to the monitored device 130. The access restriction can be temporary (e.g., for an hour), or indefinite until, for instance, an administrator reauthorizes access to the monitored device 130. Other examples of actions include providing a notification of the activity data to the guardian device 140, providing alerts and/or notifications to the monitored device 130, or performing actions associated with the monitoring system of the property 101, e.g., enabling/disabling an alarm status of the property 101, enabling/disabling a network router, configuring the control unit 110 to perform additional monitoring, among others.

As discussed above, in some implementations, the activity data includes screen activity of the monitored device 130 by users inside the property 101 over a particular time period. In such implementations, the one or more conditions includes a condition specifying that the screen activity indicates that a user has accessed restricted content through the monitored device 130. As shown in FIG. 2, the restricted content can include explicit Internet content that a child should not be accessing through the monitoring device 130. In this example, the action specified by the monitoring activity rule includes an instruction to the monitored device 130 to disable a screen based on satisfaction of the condition specifying that the user has accessed restricted content through the monitored device 130. For example, the application server 150 can provide the instruction through an associated application that is installed on monitored device 130 and capable of controlling the monitored device 130 based on receiving the instruction.

In some implementations, the activity data includes screen activity of the computing device over a particular time period, and the one or more conditions includes a condition that the user has accessed restricted content through the computing device (e.g.., accessing a webpage that provides access to explicit content). In such implementations, the applications server 150 can determine that the screen activity indicates that the user has accessed restricted content through the computing device and perform certain actions in response. For example, the application server 150 can determine the guardian device 140 for an authorized user 103 associated with the property 101 by accessing account information for the property 101 and identifying a device that is registered as having administrator privileges. The application server 150 can also provide a notification for output to the guardian device 140 that indicates that the user has accessed restricted content through the monitored device 130. As discussed above, the notification can include information identifying the content attempted to be accessed on the monitored device 130 (e.g., webpage information, type of contents, reasons that the content was flagged as being explicit/inappropriate, etc.).

In some implementations, the sensor data includes video data of the user inside the property during particular time period. For example, the video data can include a field of view that includes a user inside the property 101 as she/he accesses the monitored device 130 over the particular time period. In such implementations, the application server 150 can determine that the activity data and the sensor data satisfy the one or more conditions of the activity monitoring rule by determining, based on the video data of the user inside the property during the particular time period, that the user has accessed the computing device over the particular time period. For example, the application server 150 can process the video data to confirm that a user identified within the video data is the same user that is identified in the activity data as accessing the monitored device 130, and also confirm that the user is accessing the monitored device 130 during the particular time period. In this example, the application server 150 can also process the activity data to determine that the screen activity indicates that the user has accessed restricted content through the monitored device 130.

In some implementations, the application server 150 can perform certain specialized operations to process the sensor data and the activity data in parallel to determine whether one or more conditions of the activity monitoring rule have been satisfied. For example, the application server 150 can determine that the user has accessed the monitored device 130 over the particular time period based on the activity data and that the user is a child based on the video data indicating that a child is presently accessing the monitored device 130. In this example, the application server 150 can determine that a condition specifying that the child has accessed restricted content through the monitored device 130 has been satisfied. In other examples, the video data can be used to confirm an identity of a user that is presently accessing the monitored device 130. For instance, the application server 150 can determine, based on the video data, that the user is not a child and in response, determine that the activity data does not satisfy a conditions of the activity monitoring rule that is applicable only to a child.

In some implementations, the sensor data received by the application server 150 can include weather data indicating sunshine outside the property 101 over the particular time period and the one or more conditions can include a condition specifying a threshold time period for screen activity of the monitored device 130 over the particular time period. In such implementations, if the application server 150 determines that the screen activity of the monitored device 130 exceeds the threshold (e.g., a user has continuously used the monitored device 130 during the particular time period), then application server 150 can determine that the condition has been satisfied, and in response, provide a notification to the monitored device 130 for the user to perform outdoor physical activity. For example, as discussed above, the notification can include suggestions, such as, playing basketball outside, going for a walk to the park, or going for jog outside.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magnetooptical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, some implementations are within the scope of the disclosure.

The invention claimed is:
1. A method comprising:
obtaining activity data indicating usage of a computing device by a user within a property over a particular time period;
obtaining external sensor data that i) indicates at least an occupancy of the property during the particular time period and ii) was collected by a sensor that is part of a monitoring system that monitors the property over the particular time period, wherein the sensor is installed in the property and external to the computing device;
predicting a context associated with the usage of the computing device by the user;
selecting, using the occupancy of the property and the predicted context, an activity monitoring rule from a plurality of activity monitoring rules associated with the computing device, wherein each monitoring rule included in the plurality of activity monitoring rules specifies (i) one or more conditions associated with usage of the computing device by the user, and (ii) a notification to provide to a guardian device in response to satisfaction of the one or more conditions;
determining that the activity data and the external sensor data satisfy the one or more conditions specified by the activity monitoring rule that was selected from the plurality of activity monitoring rules by:
determining, using the external sensor data, that the user has accessed the computing device over the particular time period; and
in response to determining that the activity data and the external sensor data satisfy the one or more conditions of the activity monitoring rule that was selected from the plurality of activity monitoring rules, providing the notification specified by the activity monitoring rule to the guardian device.
2. The method of claim 1, wherein:
the activity data comprises screen activity of the computing device over the particular time period;
the one or more conditions specified by the activity monitoring rule comprise a condition specifying that the screen activity indicates that the user has accessed restricted content through the computing device; and in response to satisfaction of the one or more conditions specified by the activity monitoring rule the method further comprises providing, to the computing device, an instruction to disable a screen of the computing device based on satisfaction of the condition specifying that the user has accessed restricted content through the computing device.

3. The method of claim 1, wherein:

the activity data comprises screen activity of the computing device over the particular time period;

the one or more conditions specified by the activity monitoring rule comprises a condition that the user has accessed restricted content through the computing device;

determining that the activity data and the external sensor data satisfy the one or more conditions specified by the activity monitoring rule comprises determining that the screen activity indicates that the user has accessed restricted content through the computing device; and wherein the notification indicates that the user has accessed restricted content through the computing device based on satisfaction of the condition specifying that the user has accessed restricted content through the computing device.

4. The method of claim 3, wherein:

the external sensor data comprises video data of the user inside the property during the particular time period;

determining that the activity data and the external sensor data satisfy the one or more conditions specified by the activity monitoring rule further comprises:

determining, based on the video data of the user inside the property during the particular time period, that the user has accessed the computing device over the particular time period; and in response to determining that the user has accessed the computing device over the particular time period, determining that the screen activity indicates that the user has accessed restricted content through the computing device.

5. The method of claim 1, wherein:

the activity data comprises screen activity of the computing device over the particular time period;

the external sensor data comprises video data of the user inside the property during the particular time period;

the one or more conditions specified by the activity monitoring rule comprises a condition that the user has accessed restricted content through the computing device;

determining that the activity data and the external sensor data satisfy the one or more conditions specified by the activity monitoring rule further comprises:

based on the video data of the user inside the property during the particular time period, determining that (i) the user has accessed the computing device over the particular time period and (ii) the user is a child; and based on determining that the user has accessed the computing device over the particular time period and the user is a child, determining that the screen activity indicates that the user has accessed restricted content through the computing device.

6. The method of claim 1, wherein:

the activity data comprises screen activity of the computing device over the particular time period;

the external sensor data comprises video data of the user inside the property during the particular time period;

the one or more conditions specified by the activity monitoring rule comprises a condition that a child has accessed restricted content through the computing device; and the method further comprises:

determining, based on the video data of the user inside the property during the particular time period, that the user is not a child; and determining, based on determining that the user is not a child, that the activity data does not satisfy the one or more conditions specified by the activity monitoring rule.

7. The method of claim 1, wherein:

the activity data comprises screen activity of the computing device over the particular time period;

the external sensor data comprises weather data indicating sunshine outside the property over the particular time period;

the one or more conditions specified by the activity monitoring rule comprises a condition specifying a threshold time period for screen activity of the computing device over the particular time period;

determining that the activity data and the external sensor data satisfy the one or more conditions specified by the activity monitoring rule comprises determining that the activity data satisfies the threshold time period for screen activity of the computing device over the particular time period; and wherein the notification comprises an indication for the user to perform outdoor physical activity based on (i) satisfaction of the condition specifying the threshold time period for screen activity of the computing device over the particular time period and (ii) the weather data indicating sunshine outside the property over the particular time period.

8. The method of claim 1, wherein the plurality of activity monitoring rules comprises an activity monitoring rule that specifies (i) a particular condition associated with usage of the computing device by the user (ii) a known condition previously detected at the property, and (iii) an action to perform in response to satisfaction of the particular condition and the external sensor data indicating a condition at the property during the particular time period that matches the known condition previously detected at the property.

9. The method of claim 1, wherein:

the method further comprises selecting, based on the occupancy of the property during the particular time period, a particular guardian device to provide a notification specified by the activity monitoring rule that was selected from the plurality of activity monitoring rules; and providing the notification specified by the activity monitoring rule by providing the notification to the particular guardian device.

10. The method of claim 9, wherein the occupancy of the property during the particular time period indicates that a particular guardian was likely occupying the property during the particular time period that the computing device was being used by the user within the property.

11. The method of claim 1, wherein determining that the activity data and the external sensor data satisfy the one or more conditions specified by the activity monitoring rule that was selected from the plurality of activity monitoring rules comprises:

determining from the external sensor data that a guardian was likely occupying the property during the particular time period that the computing device was being used by the user within the property.

12. The method of claim 1, wherein the sensor comprises a security camera installed at the property, wherein the external sensor data represents video captured by the security camera that shows the computing device while the computing device was being used by the user, and determining occupancy of the property during the particular time period based on the video captured by the security camera.

13. A system comprising:

one or more computers; and one or more storage devices storing instructions that, when executed by the one or more computers, cause the one or more computers to perform operations comprising:

obtaining activity data indicating usage of a computing device by a user within a property over a particular time period;

obtaining external sensor data that i) indicates at least an occupancy of the property during the particular time period and ii) was collected by a sensor that is part of a monitoring system that monitors the property over the particular time period, wherein the sensor is installed in the property and external to the computing device;

predicting a context associated with the usage of the computing device by the user;

selecting, using the occupancy of the property and the predicted context, an activity monitoring rule from a plurality of activity monitoring rules associated with the computing device, wherein each monitoring rule included in the plurality of activity monitoring rules specifies (i) one or more conditions associated with usage of the computing device by the user, and (ii) a notification to provide to a guardian device in response to satisfaction of the one or more conditions;

determining that the activity data and the external sensor data satisfy the one or more conditions specified by the activity monitoring rule that was selected from the plurality of activity monitoring rules by:

determining, using the external sensor data, that the user has accessed the computing device over the particular time period; and in response to determining that the activity data and the external sensor data satisfy the one or more conditions of the activity monitoring rule that was selected from the plurality of activity monitoring rules, providing the notification specified by the activity monitoring rule to the guardian device.

14. The system of claim 13, wherein:

the activity data comprises screen activity of the computing device over the particular time period;

the one or more conditions specified by the activity monitoring rule comprise a condition specifying that the screen activity indicates that the user has accessed restricted content through the computing device; and in response to satisfaction of the one or more conditions specified by the activity monitoring rule the operations further comprise providing, to the computing device, an instruction to disable a screen of the computing device based on satisfaction of the condition specifying that the user has accessed restricted content through the computing device.

15. The system of claim 13, wherein:

the activity data comprises screen activity of the computing device over the particular time period;

the one or more conditions specified by the activity monitoring rule comprises a condition that the user has accessed restricted content through the computing device;

determining that the activity data and the external sensor data satisfy the one or more conditions specified by the activity monitoring rule comprises determining that the screen activity indicates that the user has accessed restricted content through the computing device; and wherein the notification indicates that the user has accessed restricted content through the computing device based on satisfaction of the condition specifying that the user has accessed restricted content through the computing device.

16. The system of claim 15, wherein:

the external sensor data comprises video data of the user inside the property during the particular time period;

determining that the activity data and the external sensor data satisfy the one or more conditions of the activity monitoring rule further comprises:

determining, based on the video data of the user inside the property during the particular time period, that the user has accessed the computing device over the particular time period; and in response to determining that the user has accessed the computing device over the particular time period, determining that the screen activity indicates that the user has accessed restricted content through the computing device.

17. The system of claim 13, wherein:

the activity data comprises screen activity of the computing device over the particular time period;

the external sensor data comprises video data of the user inside the property during the particular time period;

the one or more conditions specified by the activity monitoring rule comprises a condition that the user has accessed restricted content through the computing device;

determining that the activity data and the external sensor data satisfy the one or more conditions specified by the activity monitoring rule further comprises:

based on the video data of the user inside the property during the particular time period, determining that (i) the user has accessed the computing device over the particular time period and (ii) the user is a child; and based on determining that the user has accessed the computing device over the particular time period and the user is a child, determining that the screen activity indicates that the user has accessed restricted content through the computing device.

18. A non-transitory computer-readable storage device encoded with computer program instructions that, when executed by one or more computers, cause the one or more computers to perform operations comprising:

obtaining activity data indicating usage of a computing device by a user within a property over a particular time period;

obtaining external sensor data that i) indicates at least an occupancy of the property during the particular time period and ii) was collected by a sensor that is part of a monitoring system that monitors the property over the particular time period, wherein the sensor is installed in the property and external to the computing device;

predicting a context associated with the usage of the computing device by the user;

selecting, using the occupancy of the property and the predicted context, an activity monitoring rule from a plurality of activity monitoring rules associated with the computing device, wherein each monitoring rule included in the plurality of activity monitoring rules specifies (i) one or more conditions associated with usage of the computing device by the user, and (ii) a notification to provide to a guardian device in response to satisfaction of the one or more conditions;

determining that the activity data and the external sensor data satisfy the one or more conditions specified by the activity monitoring rule that was selected from the plurality of activity monitoring rules by:

determining, using the external sensor data, that the user has accessed the computing device over the particular time period; and in response to determining that the activity data and the external sensor data satisfy the one or more conditions of the activity monitoring rule that was selected from the plurality of activity monitoring rules, providing the notification specified by the activity monitoring rule to the guardian device.

19. The device of claim 18, wherein:

the activity data comprises screen activity of the computing device over the particular time period;

the one or more conditions specified by the activity monitoring rule comprise a condition specifying that the screen activity indicates that the user has accessed restricted content through the computing device; and in response to satisfaction of the one or more conditions specified by the activity monitoring rule the operations further comprise providing, to the computing device, an instruction to disable a screen of the computing device based on satisfaction of the condition specifying that the user has accessed restricted content through the computing device.

20. The device of claim 18, wherein:

the activity data comprises screen activity of the computing device over the particular time period;

the one or more conditions specified by the activity monitoring rule comprises a condition that the user has accessed restricted content through the computing device;

determining that the activity data and the external sensor data satisfy the one or more conditions specified by the activity monitoring rule comprises determining that the screen activity indicates that the user has accessed restricted content through the computing device; and wherein the notification indicates that the user has accessed restricted content through the computing device based on satisfaction of the condition specifying that the user has accessed restricted content through the computing device.

21. The device of claim 20, wherein:

the external sensor data comprises video data of the user inside the property during the particular time period;

determining that the activity data and the external sensor data satisfy the one or more conditions specified by the activity monitoring rule further comprises:

determining, based on the video data of the user inside the property during the particular time period, that the user has accessed the computing device over the particular time period; and in response to determining that the user has accessed the computing device over the particular time period, determining that the screen activity indicates that the user has accessed restricted content through the computing device.

22. The device of claim 21, wherein determining that the user has accessed the computing device over the particular time period comprises:

obtaining device usage data for the computing device, the device usage data indicating time points within the particular time period when the computing device was accessed;

processing frames of the video data corresponding to the time points within the particular time period when the computing device was accessed; and determining, based on processing the frames of the video data corresponding to the time points within the particular time period when the computing device was accessed, that the video data identifies the user as accessing the computing device during the particular time period.

\* \* \* \* \*